United States Patent Office 3,610,046
Patented Oct. 5, 1971

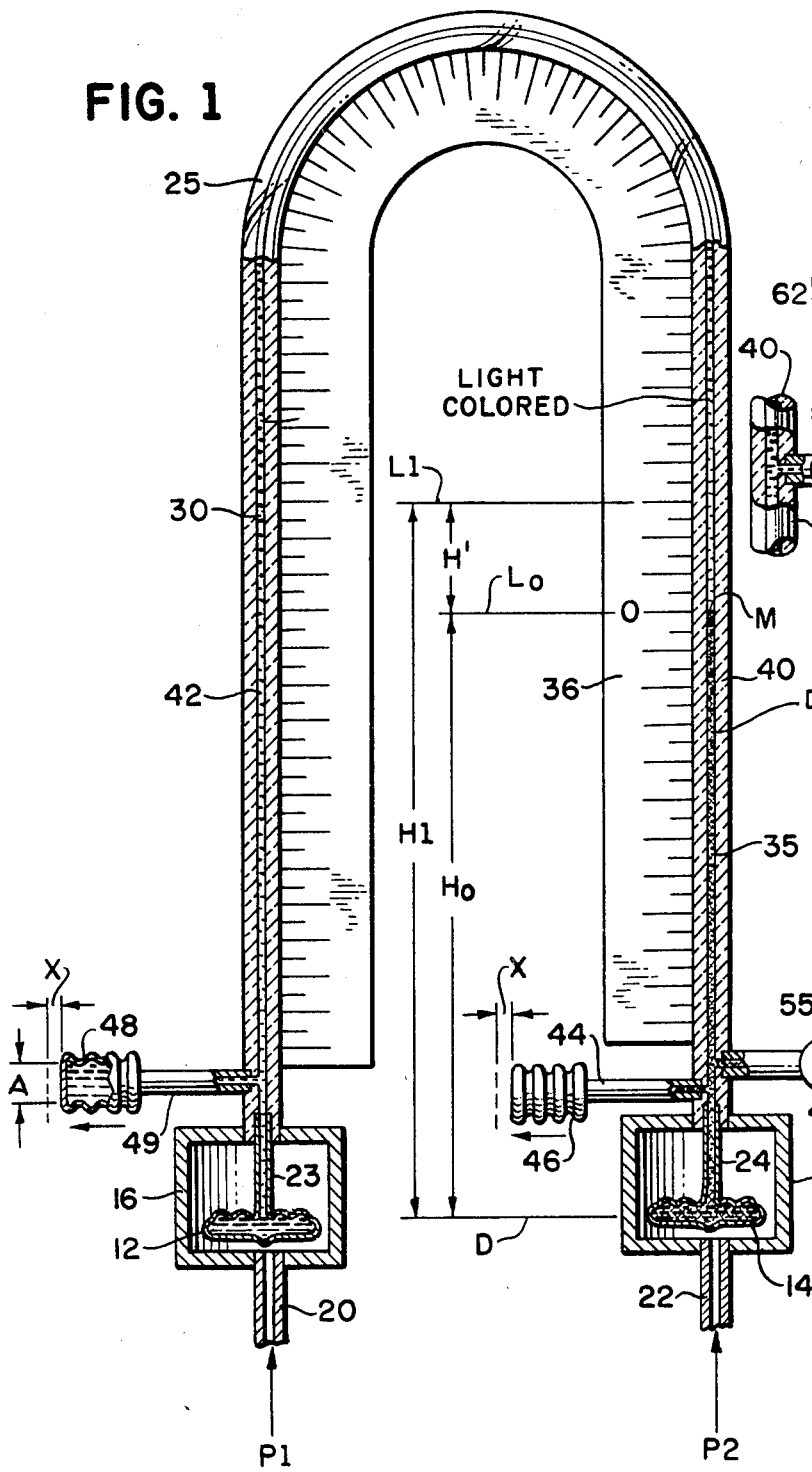
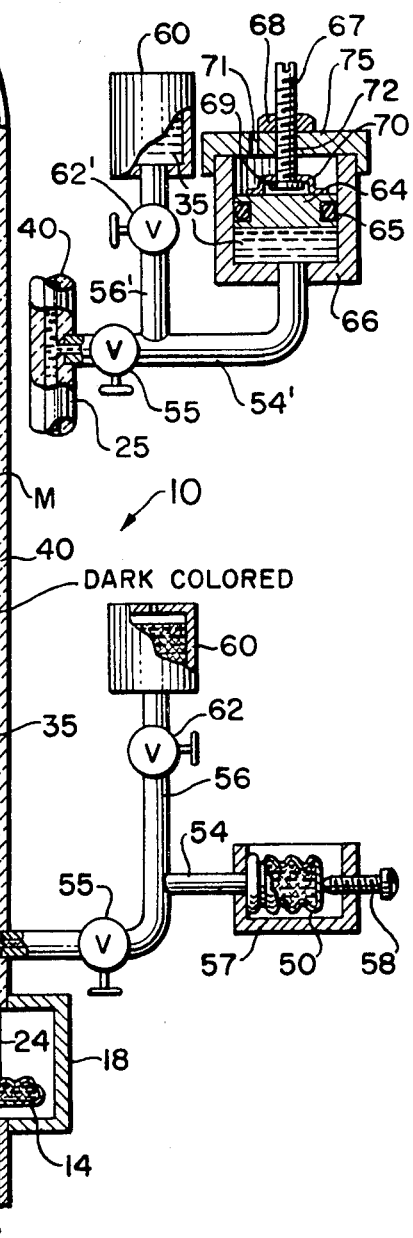

3,610,046
ALL-FLUID DIFFERENTIAL PRESSURE GAUGE
Frederic Lissau, Forest Hills, N.Y., assignor to
Liquidonics, Inc., Westbury, N.Y.
Filed Mar. 27, 1970, Ser. No. 23,220
Int. Cl. G01l 7/08
U.S. Cl. 73—407                                        10 Claims

ABSTRACT OF THE DISCLOSURE

A differential pressure gauge includes a U-shaped transparent tube having legs at its ends connected to two identical closed pressure responsive elements enclosed in casings to which conduits from two different pressure sources are connected. The tube and pressure responsive elements are filled with two different fluids meeting at a meniscus in the tube. A scale adjacent to the tube indicates the position of the meniscus and provides a reading of any change in position due to change in relative pressures applied to the two elements. Two identical closed expansible pressure responsive members are connected to the two legs of the tube to expand and contract equally when pressure in the tube changes. Volume adjustment means may be connected to the tube for adjusting relative volumes of the fluids in the tube in accordance with any difference in thermal coefficients of expansion of the fluids in the tube.

---

This invention concerns an all fluid differential pressure gauge.

Differential pressure gauges heretofore known have generally employed mechanically moving parts which cause a number of difficulties and have several disadvantages. Besides their high cost and mechanical complexity of their levers, gears, pivots and bearings, they cannot be relied upon for accuracy in readings. The mechanisms are subject to backlash, vibration, friction, wear, changes in ambient temperature, expansion and contraction, etc., all of which renders the instruments inaccurate and unreliable.

The present invention is directed at an all fluid differential pressure gauge in which mechanically moving parts are eliminated. The gauge is accurate and reliable at all ambient temperatures. Pressure sensitive elements are employed which provide linearity of response. The entire mechanism is hermetically sealed. Hysteresis is avoided and backlash is eliminated. Provision is made for automatically compensating for temperature changes to leave scale readings unaffected. The gauge can be manufactured at relatively low cost and will provide more accurate, reliable differential pressure readings over a longer useful life than has hitherto been possible with conventional differential pressure gauges.

According to the invention, there is provided a U-shaped transparent tube connected at opposite ends to closed pressure responsive capsules filled with two different fluids and exposed in two casings to externally applied fluid pressures. The fluids meet at a point whose position is indicated by a fixed scale. Two identical bellows are connected to legs of the tube to respond equally to any change in pressure in the tube so that the scale reading does not change regardless of any change in ambient temperature. However any change in relative pressures applied to the two capsules is indicated by a change in position of the meniscus, while the two bellows expand or contract equally in response to the net change in pressure of the fluids in the tube. Volume adjustment means including a reservoir and another adjustable bellows or piston is connected to one leg of the tube to compensate for any difference in coefficients of thermal expansion of the two fluids.

The invention will be explained in further detail in connection with the drawing, wherein:

FIG. 1 is a vertical elevational view partially in section and partially diagrammatic of a differential pressure gauge embodying the invention.

FIG. 2 is a fragmentary sectional view of a piston operated volume adjustment device which can be used in the gauge of FIG. 1.

Referring first to FIG. 1, the pressure gauge 10 includes two pressure responsive elements 12, 14. Each element is a closed capsule with flexible walls. The elements are identical in structure. They have the same axial length, cross sectional area, internal volume and spring rate. Each responds in the same way and to the same extent to the same applied pressure. The elements are disposed in closed casings 16, 18. Conduits 20, 22 are connected to the casings respectively. Fuid which may be gas or liquid under pressure can be applied through the conduits. Pressures P1 and P2 can thus be applied to the respective elements.

Gauge 10 provides an accurate reading of the difference in pressures, i.e. $P2-P1$ or $P1-P2$, applied to the capsules. Connected to the capsules via tubes 23, 24 are opposite ends of an inverted U-tube 25. The tube is transparent and contains two fluids 30, 35. Fluid 30 is light colored and fluid 35 is dark colored. The fluids are mutually immiscible and meet at a meniscus M shown at 0 reading on graduated scale 36. Scale 36 is located adjacent to tube 25 and extends around the tube alongside legs 40 and 42. The fluids completely fill tube 25 and capsules 12, 14. Connected to leg 40 near its bottom end via a conduit 44 is a first bellows 46. Another bellows 48 is connected to leg 42 near its bottom end via a conduit 49. The two bellows are identical in construction. Their internal volumes are the same. They have the same axial length, cross sectional areas and spring rate. Each bellows expands and contracts axially the same amount in response to variations in pressure of the fluids. The bellows 46 and 48 provide automatic compensation for temperature change of fluids 30, 35. If the fluids have the same thermal coefficient of expansion and if the total volumes of the two fluids are the same, any change in pressure in tube 25 due to change in temperature of the fluids will cause equal expansion or contraction of the bellows as the fluids expand or contract. Thus the position of meniscus M at scale 36 will not change due to any change in fluid temperature.

If the fluids 30, 35 have different thermal coefficients of expansion, the bellows 46, 48 will operate in the same way. However it will be necessary to provide means for adjusting the relative volumes of fluids 30 and 35 to compensate for the difference in thermal coefficients of expansion. One way of doing this is shown in FIG. 1 and includes a closed bellows 50 connected via conduits 54, 56 and manually operable valve 55 to leg 40 of tube 25. The bellows 50 is supported in a frame 57 and is axially adjustable in volume by a screw supported by the frame and bearing on one end of the bellows. Fluid 35 can be added or withdrawn from tube 25 by turning screw 58 while the valve is open. A reservoir 60 contains a reserve supply of fluid and is connected to conduit 56 via a valve 62. This valve is normally closed except when required to pass fluid into or out of reservoir 60. The relative volumes of the fluids are adjusted by means of adjustment screw 58. If fluid 35 has a higher thermal coefficient of expansion than fluid 30, less fluid 35 will be required and this will be effected by closing valve 55 and opening valve 62 and turning screw 58 to adjust the volume of bellows 50. Once the proper relative volumes are obtained, valve 62 can be closed and valve 55 can be opened. Then with equal pressures P1, P2 applied via conduits 20, 22, the 0 reading of scale 36 will be set at the location of meniscus M. This can be done by adjusting bellows 50 by means of screw 58.

FIG. 2 shows another means for varying the relative volumes of fluids 30 and 35. A piston 64 is movably disposed in a housing 66. A resilient O-ring 65 seals the piston. The piston is axially movable and can be advanced or retracted by means of a screw 67 threaded in hole 72 in the top of the housing. A nut 68 locks the screw in position. The screw has a head 69 rotatably engaged in a bracket 70 secured to the top of piston 64. A hole 71 in the top 75 of the housing relieves air pressure. The housing contains fluid 35 and communicates with leg 40 of tube 25 via conduit 54'. Reservoir 60 is connected to conduit 54' via conduit 56' and valve 62'. Axial adjustment of the position of the piston in the housing varies the amount of fluid 35 in leg 40.

When the pressures P1 and P2 applied to pressure responsive elements 12 and 14 are equal, meniscus M is at level $L_0$ which is a distance $H_0$ above datum line D. Level $L_0$ corresponds to 0 reading on scale 36. Since pressures P1 and P2 are equal in the condition shown in FIG. 1, both elements 12 and 14 will displace the same amount of fluid into bellows 46 and 48 which will expand the same amount X. If the pressure P1 and P2 increase or decrease but remain unchanged with respect to each other, the gauge will still indicate 0, since meniscus M will remain at level $L_0$. The bellows 46 and 48 will respond equally and identically to changes in pressure in the fluid whether due to ambient temperature change or to change in pressure applied to elements 12 and 14.

Suppose now that the pressure applied to one of elements 12, 14 is made greater than the other, for example pressure P2 is made greater than P1. Element 14 will now displace a larger volume of fluid into tube 25 than element 12. Both bellows 46 and 48 will again expand equal amounts because the pressure in tube 25 is always uniform throughout its length. Since a greater volume of fluid 35 has been pumped into the readout system the level of meniscus M will increase to $H_1$. This will be at level $L_1$. The change in level by $H'$ is indicated by the new reading on scale 36 at level $L_1$. The displacement $H_1$ is a reading of pressure differential or the absolute difference between pressures P2 and P1. If pressure P1 were made larger than pressure P2, then the new scale reading would be below level $L_0$ on scale 36.

The volume adjustment bellows 50 and piston 64 are shown operatively connected to leg 40 in FIGS. 1 and 2 respectively. They could be connected instead to leg 42. Furthermore the fluid 30 can be the dark colored fluid and fluid 35 can be light colored. The light colored fluid can be transparent. A suitable support (not shown) will be provided to hold tube 25 in stationary vertical position. Scale 36 can be mounted on the same support and may be vertically adjustable with respect to the tube to locate the 0 scale reading precisely at meniscus M. Instead of capsules 12, 14 which are axially shorter than their diameters, bellows similar to belows 46 and 48 which are axially comparable in length to their diameters, can be connected to bottom ends of tube 25 in casings 16, 18.

The gauge described will provide a very accurate measurement of differential pressure in a relatively simple, reliable structure.

Although a single embodiment of the invention has been described in detail, many variations are possible. For example, the U-tube does not have to be vertical. Since it operates in a closed system it can be mounted in any position. Furthermore the tube does not have to have a U-shape. It can have any continuous contour or curve provided that it terminates in two legs having open ends. The "0" position of the scale can be located at any convenient point along the tube. The pressure responsive elements 12 and 14 are not limited to capsules or bellows with corrugated walls. The pressure responsive elements could be tubular in form or have some other configuration. The scale 36 can be provided with optical means for eliminating the effects of parallax to insure accuracy in reading. Other modifications will readily occur to those skilled in the art.

What is claimed is:

1. A differential pressure gauge, comprising a continuous tube with two legs open at ends thereof; a pair of identical closed pressure responsive elements connected to the open ends respectively of the legs; means for applying pressures from two different pressure sources to said elements respectively; a graduated scale disposed adjacent to the tube; two different fluids filling said pressure responsive elements and meeting at a meniscus point in said tube adjacent to the scale, said tube being transparent so that the position of the meniscus is readable on the scale; and closed expansible members connected to said legs respectively and filled with said fluids respectively, said expansible members having identical internal volumes and spring rates, so that both of said members expand and contract equally in response to any change in pressure in the tube, whereby said meniscus point moves along said scale a distance which corresponds linearly to any change in relative pressure differential applied to said pressure responsive elements respectively.

2. A differential pressure gauge as defined in claim 1, further comprising adjustable reservoir means connected to one leg of the tube for adding and withdrawing fluid to adjust the relative volumes of the two fluids in the tube.

3. A differential pressure gauge as defined in claim 1, wherein each pressure responsive element is a closed capsule having at least one flexible wall; and further comprising a pair of casings enclosing said capsules respectively and arranged for receiving other fluids under pressure from said sources for applying the pressurized fluids externally to the flexible walls of the capsules.

4. A differential pressure gauge as defined in claim 3, further comprising adjustable reservoir means connected to one leg of the tube for adding and withdrawing fluid to adjust the relative volumes of the two first named fluids in the tube.

5. A differential pressure gauge as defined in claim 4, wherein said reservoir means comprises a bellows filled with one of the two first named fluids and connected at one end to said one leg of the tube; and means engaging the other end of the bellows for varying the volume of the bellows.

6. A differential pressure gauge as defined in claim 5, further comprising a container of said one fluid connected via valve means to said one leg and said bellows to serve as a reservoir for said one fluid.

7. A differential pressure gauge as defined in claim 4, wherein said reservoir means comprises a housing partially filled with one of the first named fluids; and a piston in said housing arranged for movement to force said one fluid into said one leg and to withdraw said one fluid from said one leg; and a container of said one fluid connected via valve means to said one leg and to said housing to serve as a reservoir for said one fluid.

8. A differential pressure gauge as defined in claim 1, wherein said closed expansible members are bellows connected via conduits to said legs respectively of the tube, said bellows both having equal cross sectional areas and spring rates so that both bellows change in volume equally for any change in pressure of the fluids in the tube.

9. A differential pressure gauge as defined in claim 8, wherein said fluids have different coefficients of thermal expansion; and further comprising adjustable reservoir means connected to one leg of the tube for adding and withdrawing fluid to adjust the relative volumes of the two fluids in the tube according to the relative magnitudes of their different coefficients of thermal expansion.

10. A differential pressure gauge as defined in claim 9, wherein each pressure responsive element is a closed capsule having at least one flexible wall; and further comprising a pair of casings enclosing said capsules respectively for receiving other fluids under pressure from said sources and for applying the pressurized fluids externally to the flexible walls of the capsules.

References Cited

UNITED STATES PATENTS 2,105,127  1/1938  Petroe _____ 73—407 X

DONALD O. WOODIEL, Primary Examiner

U.S. Cl. X.R.

73—393, 401